US012583325B2

(12) United States Patent
Aoki et al.

(10) Patent No.: US 12,583,325 B2
(45) Date of Patent: Mar. 24, 2026

(54) ELECTRIC VEHICLE

(71) Applicant: ISUZU MOTORS LIMITED, Yokohama (JP)

(72) Inventors: Yuji Aoki, Fujisawa (JP); Futoshi Yamane, Fujisawa (JP); Takuya Kikuchi, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 78 days.

(21) Appl. No.: 18/644,307

(22) Filed: Apr. 24, 2024

(65) Prior Publication Data

US 2024/0359562 A1      Oct. 31, 2024

(30) Foreign Application Priority Data

Apr. 27, 2023    (JP) ................................. 2023-073730

(51) Int. Cl.
B60L 3/00      (2019.01)
B60L 58/12      (2019.01)
B60L 58/18      (2019.01)

(52) U.S. Cl.
CPC ............. B60L 3/0046 (2013.01); B60L 58/12 (2019.02); B60L 58/18 (2019.02)

(58) Field of Classification Search
CPC ........ B60L 3/0046; B60L 58/12; B60L 58/18; B60L 3/0069; B60L 3/04; B60L 3/0023; B60L 53/14; B60L 58/10
USPC ......................................................... 701/22
See application file for complete search history.

(56) References Cited

FOREIGN PATENT DOCUMENTS

JP          2019134603 A  *  8/2019
JP          2020156269 A  *  9/2020

* cited by examiner

*Primary Examiner* — Maceeh Anwari
(74) *Attorney, Agent, or Firm* — Shih IP Law Group, PLLC

(57)      ABSTRACT

An electric vehicle includes: a mounted object operated by power; and a vehicle body equipped with the mounted object, in which the vehicle body includes: a battery that supplies power to an electric motor for operation of the vehicle body; a first power supply line that supplies the power from the battery to the mounted object; a first protection circuit that is installed on the first power supply line and that is capable of cutting off the power; and a control section that controls an operation of the first protection circuit, and the mounted object includes: a second power supply line that is connected to the first power supply line; a load that receives the power via the second power supply line; and a second protection circuit that is installed on the second power supply line and that is capable of cutting off the power.

3 Claims, 4 Drawing Sheets

ELECTRIC VEHICLE

CROSS REFERENCE TO RELATED APPLICATIONS

The entire disclosure of Japanese patent Application No. 2023-073730 filed on Apr. 27, 2023, is incorporated herein by reference in its entirety.

BACKGROUND

Technological Field

The present disclosure relates to an electric vehicle.

Description of Related Art

An electric work vehicle has been known which includes a battery and a vehicle body equipped with an electric motor driven by power from the battery.

Further, in recent years, from the viewpoint of reducing environmental load, an electric vehicle in which the mounted object is operated by power from a battery has been known even in work vehicles equipped with mounted objects for performing a predetermined work. In such an electric vehicle, a high-voltage power is supplied from a high-voltage battery necessary for running to a mounted object, so that it is required to ensure safety.

For example, Japanese Patent Application Laid Open No. 2019-134603 describes an electric work vehicle in which a relay circuit is installed on a power supply line that supplies power from a battery to a mounted object.

Incidentally, when the relay circuit placed on the power supply line fails, it is required to improve the safety in order to prevent a user from receiving an electric shock by touching the power supply line. In addition, it is required to protect components of the mounted object in order to prevent a high voltage from being applied to the components.

SUMMARY

An object of the present disclosure is to provide an electric vehicle capable of improving the safety and protecting a component.

To achieve the above-mentioned object, an electric vehicle in the present disclosure is an electric vehicle that includes: a mounted object operated by power; and a vehicle body equipped with the mounted object, in which the vehicle body includes: a battery that supplies power to an electric motor for operation of the vehicle body; a first power supply line that supplies the power from the battery to the mounted object; a first protection circuit that is installed on the first power supply line and that is capable of cutting off the power; and a control section that controls an operation of the first protection circuit, and the mounted object includes: a second power supply line that is connected to the first power supply line; a load that receives the power via the second power supply line; and a second protection circuit that is installed on the second power supply line and that is capable of cutting off the power.

BRIEF DESCRIPTION OF DRAWINGS

The advantageous and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
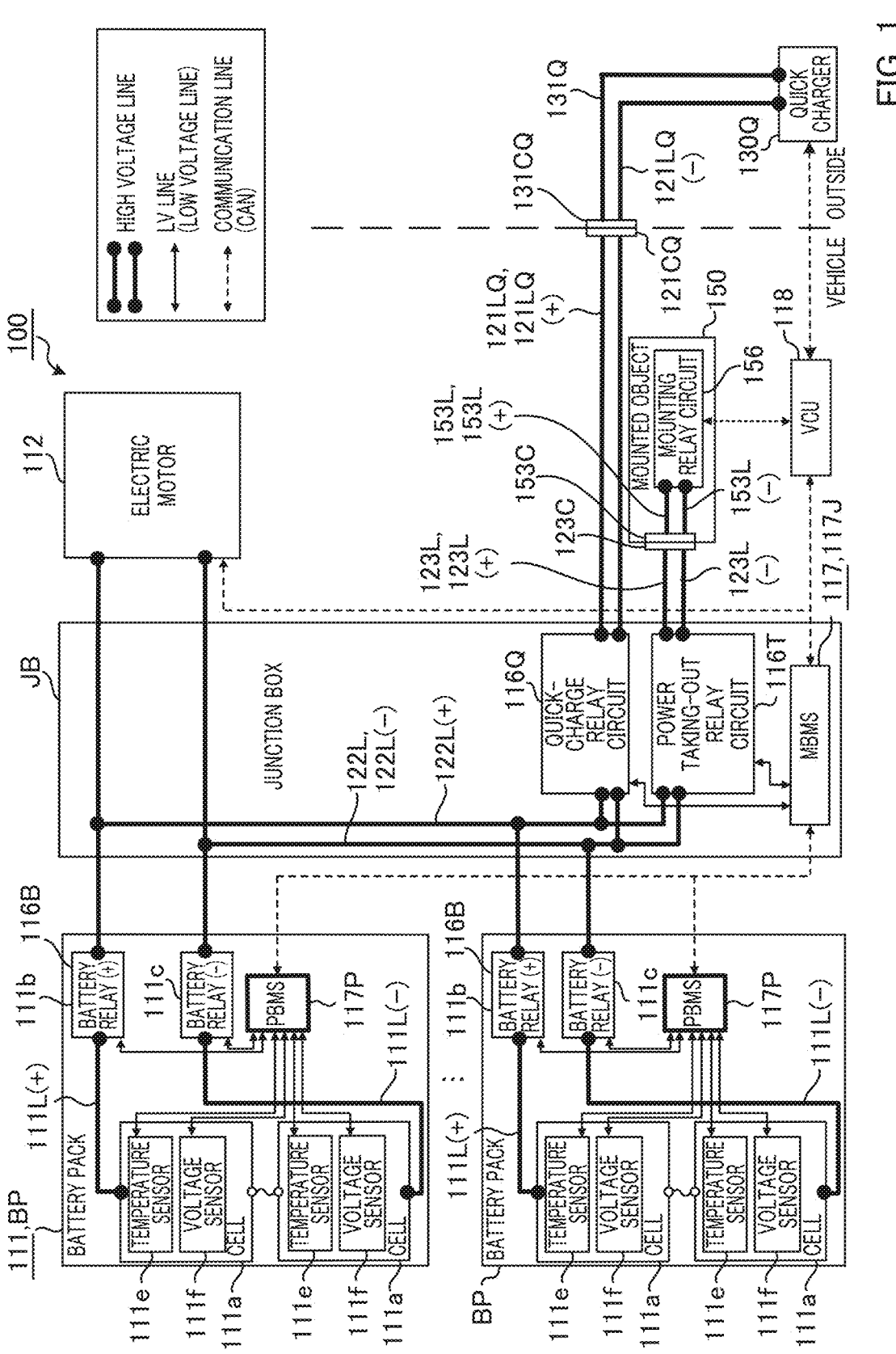
FIG. 1 is a configuration block diagram illustrating an exemplary configuration of an electric vehicle in an embodiment of the present disclosure.

Hereinafter, one or more embodiments of the present invention will be described with reference to the drawings. However, the scope of the invention is not limited to the disclosed embodiments. Hereinafter, an embodiment of the present disclosure will be described with reference to the drawings. FIG. 1 illustrates an exemplary power system of an electric vehicle in an embodiment in the present disclosure. Electric vehicle (EV) 100 in the present embodiment is an electric work vehicle including battery 111, electric motor 112 for traveling that is driven by power of battery 111, and vehicle body 110 equipped with mounted object 150 that performs a predetermined work using the power of battery 111. Note that electric vehicle 100 in the present embodiment includes, for example, a load such as a heater (not illustrated), in addition to electric motor 112 and mounted object 150, but a description of the load will be omitted for simplicity of description of the embodiment.

(Battery 111)

Battery 111 is a secondary battery that is charged by an external power source. Battery 111 includes one or a plurality of battery packs BP. Each of the plurality of battery packs BP has the same configuration; hence, one battery pack BP among the plurality of battery packs BP will be representatively described. Battery pack BP includes a plurality of cells $111a$, battery relay (+) $111b$, battery relay (−) $111c$, and battery-pack management system (PBMS) $117P$. Incidentally, battery relay (+) $111b$ and battery relay (−) $111c$ are collectively referred to as "battery relay circuit $116B$." Battery relay circuit $116B$ may be referred to as a "fourth protection circuit."

One terminal of battery relay (+) $111b$ is connected to a positive terminal of cell $111a$ via high voltage line $111L$ (+). The other terminal of battery relay (+) $111b$ is connected to high voltage line $122L$ (+). One terminal of battery relay (−) $111c$ is connected to a negative terminal of cell $111a$ via high voltage line $111L$ (−). The other terminal of battery relay (−) $111c$ is connected to high voltage line $122L$ (−).

Cell $111a$ includes temperature sensor $11e$ and voltage sensor $111f$. Temperature sensor $11e$ detects a cell temperature. Temperature sensor $11e$ outputs a detection result (cell temperature) to battery-pack management system $117P$. Voltage sensor $111f$ detects a cell voltage. Voltage sensor $111f$ outputs a detection result (cell voltage) to battery-pack management system $117P$. Voltage sensor $111f$ may be referred to as a "fourth detection section."

Battery-pack management system $117P$ controls battery relay (+) $111b$ such that connection/disconnection between high voltage line $111L$ (+) and high voltage line $122L$ (+) is performed, and also controls battery relay (−) $111c$ such that connection/disconnection between high voltage line $111L$ (−) and high voltage line 122L (−) is performed, based on the input cell temperature and cell voltage, respectively.

(Junction Box JB)

Vehicle body 110 includes junction box JB. Junction box JB is placed between battery pack BP, and electric motor 112 and quick charger 130Q. Junction box JB includes quick-charge relay circuit 116Q, power taking-out relay circuit 116T, and battery management system 117J (MBMS). Note that battery-pack management system 117P and battery management system 117J are collectively referred to as "battery management section 117." Power taking-out relay circuit 116T may be referred to as a "first protection circuit."

One terminal (+) of quick-charge relay circuit 116Q is connected to high voltage line 122L (+). The other terminal (+) of quick-charge relay circuit 116Q is connected to connector 121CQ via high voltage line 121L (+). One terminal (−) of quick-charge relay circuit 116Q is connected to high voltage line 122L (−). The other terminal (−) of quick-charge relay circuit 116Q is connected to connector 121CQ via high voltage line 121L (−). Battery management system 117J controls, based on an instruction of vehicle control section 118 (Vehicle Control Unit: VCU), quick-charge relay circuit 116Q such that connection/disconnection between high voltage line 122L (+) and high voltage line 121L (+) and connection/disconnection between high voltage line 122L (−) and high voltage line 121L (−) are performed. In the following description, high voltage line 121LQ (+) and high voltage line 121LQ (−) are collectively referred to as "power supply line 121LQ." Moreover, high voltage line 122L (+) and high voltage line 122L (−) are collectively referred to as "power supply line 122L." Power supply line 121LQ and power supply line 122L may be referred to as a "third power supply line."

(Connector 121CQ)

(Vehicle Body 110)

Vehicle body 110 includes connector 121CQ. Connector 121CQ is also referred to as a charge port or a port. Connector 121CQ is a quick-charge connector to which connector 131CQ is electrically connectable.

(Quick Charger 130Q)

Quick charger 130Q is placed outside vehicle body 110. Quick charger 130Q includes charging cable 131Q extended from its main body and connector 131CQ provided at a tip of charging cable 131Q. The electric connection of connector 131CQ to connector 121CQ enables quick charger 130Q to charge battery 111 at a high voltage.

Vehicle body 110 includes an ignition switch (not illustrated) that is a switch for turning on/off a starter relay (not illustrated). For example, when the starter relay is turned on (key-on operation), power is transmitted from battery 111 to a coil of battery relay circuit 116B (not illustrated). Thereby battery relay circuit 116B is turned on, and thus, power is supplied from battery 111 to electric motor 112 through battery relay circuit 116B (electric motor is activated). When the starter relay is turned off (key-off operation), battery relay circuit 116B is also turned off and the power from battery 111 to electric motor 112 is thus cut off (electric motor is stopped).

(Power Supply Line 121LQ, Power Supply Line 122L, and Quick-Charge Relay Circuit 116Q)

As illustrated in FIG. 1, quick-charge relay circuit 116Q is installed on power supply lines 121LQ and 122L. Power supply line 121LQ electrically connects between connector 121CQ and quick-charge relay circuit 116Q. Power supply line 121LQ includes high voltage line 121LQ (+) and high voltage line 121LQ (−). Power supply line 122L electrically connects between battery 111 and quick-charge relay circuit

116Q. Power supply line 122L includes high voltage line 122L (+) and high voltage line 122L (−). Note that quick-charge relay circuit 116Q may also be referred to as a "third protection circuit."

Figure 2:
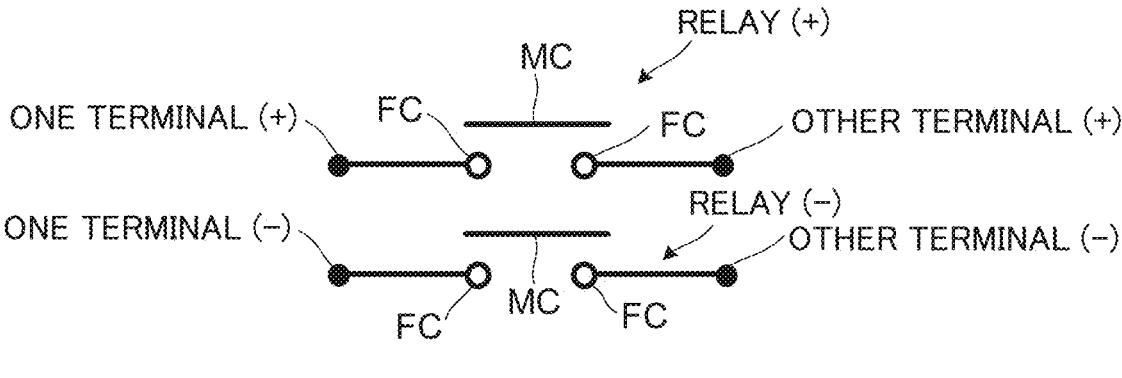
FIG. 2 schematically illustrates an exemplary relay.

FIG. 2 illustrates an exemplary quick-charge relay circuit. Quick-charge relay circuit 116Q includes a relay (+) and a relay (−). The relay (+) includes a coil (not illustrated), one terminal (+), the other terminal (+), movable contact MC, one-side fixed contact FC provided on a side of the one terminal (+), and other-side fixed contact FC provided on a side of the other terminal (+). High voltage line 121LQ (+) is connected to the one terminal (+) of the relay (+). High voltage line 122L (+) is connected to the other terminal (+) of the relay (+). The relay (−) includes a coil (not illustrated), one terminal (−), the other terminal (−), movable contact MC, one-side fixed contact FC provided on a side of the one terminal (−), and other-side fixed contact FC provided on a side of the other terminal (−). High voltage line 121LQ (−) is connected to the one terminal (−) of the relay (−). High voltage line 122L (−) is connected to the other terminal (−) of the relay (−).

In each of the relay (+) and relay (−), when the current flows through the coil, movable contact MC is attracted by an electromagnetic force and is thus brought into an electric contact with one-side fixed contact FC and other-side fixed contact FC. When no current flows through the coil, movable contact MC returns to its original position and is thus separated from each of one-side fixed contact FC and other-side fixed contact FC. Separation of movable contact MC of the relay (+) from one-side fixed contact FC and other-side fixed contact FC on the relay (+) side or separation of movable contact MC of the relay (−) from one-side fixed contact FC and other-side fixed contact FC of the relay (−) side causes power supply lines 121LQ and 122L to be electrically disconnected. This makes it possible to cut off power supplied from quick charger 130Q to battery 111.

In either the relay (+) or the relay (−) of quick-charge relay circuit 116Q, a state in which movable contact MC is welded to each of one-side fixed contact FC and other-side fixed contact FC and thus cannot be separated is referred to as a "welding failure of relay," a "single-welding failure of relay" or simply as a "single-welding failure." In addition, a state in which, in both the relay (+) and the relay (−), movable contact MC is welded to each of one-side fixed contact FC and other-side fixed contact FC and thus cannot be separated is referred to as a "double-welding failure of relay" or simply as a "double-welding failure." Further, either or both of the single-welding failure and double-welding failure is/are collectively referred to as a "welding failure."

(Power Supply Line 122 L, Power Supply Line 123 L, and Power Taking-Out Relay Circuit 116 T)

As illustrated in FIG. 1, power taking-out relay circuit 116T is installed on power supply lines 122L and 123L. Power supply line 122L electrically connects between battery 111 and power taking-out relay circuit 116T. Power supply line 123L electrically connects between power taking-out relay circuit 116T and connector 123C. Power supply line 123L includes high voltage line 123L (+) and high voltage line 123L (−). Power supply line 122L and power supply line 123L may be referred to as a "first power supply line."

Power taking-out relay circuit 116T includes a relay (+) and a relay (−). The relay (+) and the relay (−) have the same configurations as the relay (+) and the relay (−) in quick-charge relay circuit 116Q; hence, the same reference numerals are given to the same elements, and the descriptions thereof will be omitted. High voltage line 122L (+) is connected to one terminal (+) of the relay (+). High voltage line 123L (+) is connected to the other terminal (+) of the relay (+). High voltage line 122L (−) is connected to one terminal (−) of the relay (−). High voltage line 123L (−) is connected to the other terminal (−) of the relay (−).

Separation of movable contact MC of the relay (+) from one-side fixed contact FC and other-side fixed contact FC on the relay (+), or separation of movable contact MC of the relay (−) from one-side fixed contact FC and other-side fixed contact FC of the relay (−) makes it possible to cut off power supplied from battery 111 to a side of mounted object 150 (mounting relay circuit 156).

In either the relay (+) or the relay (−) of power taking-out relay circuit 116T, a state in which movable contact MC is welded to each of one-side fixed contact FC and other-side fixed contact FC and thus cannot be separated is referred to as a "welding failure of relay," a "single-welding failure of relay" or simply as a "single-welding failure." In addition, a state in which, in both the relay (+) and the relay (−), movable contact MC is welded to each of one-side fixed contact FC and other-side fixed contact FC and thus cannot be separated is referred to as a "double-welding failure of relay" or simply as a "double-welding failure." Further, either or both of the single-welding failure and double-welding failure is/are collectively referred to as a "welding failure."

(Connector 123C)

Connector 123C is electrically connected to connector 153C provided at mounted object 150.

(Mounted Object 150)

Mounted object 150 includes, in addition to connector 153C, a load (not illustrated), power supply line 153L, communication section 155, mounting relay circuit 156, detection section 157, and control section 158. Mounting relay circuit 156 may be referred to as a "second protection circuit."

(Power Supply Line 153 L and Mounting Relay Circuit 156)

High voltage line 153L electrically connects between connector 153C and mounting relay circuit 156. Power supply line 153L includes high voltage line 153L (+) and high voltage line 153L (−). Mounting relay circuit 156 includes a relay (+) and a relay (−). The relay (+) and the relay (−) have the same configurations as the relay (+) and the relay (−) in quick-charge relay circuit 116Q; hence, the same reference numerals are given to the same elements, and the descriptions thereof will be omitted. High voltage line 153L (+) is connected to one terminal (+) of the relay (+). High voltage line 153L (−) is connected to one terminal (−) of the relay (−)

(Load on Mounted Object 150)

A load (not illustrated) is, for example, an electric motor. The load is electrically connected to mounting relay circuit 156 via a power supply line (not illustrated). That is, the load (electric motor) is operated by power received from battery 111 via power supply line 122L, power taking-out relay circuit 116T, power supply line 123L, power supply line 153L, mounting relay circuit 156, and the power supply line (not illustrated). The power supply line that is not illustrated includes a high voltage line (+) and a high voltage line (−). The high voltage line (+) is connected to the other terminal (+) of the relay (+). High voltage line L (−) is connected to the other terminal (−) of the relay (−). Power supply line 153L and the power supply line that is not illustrated may be referred to as a "second power supply line." Incidentally, the second power supply line is electrically connected/disconnected by control section 158 executing close/open control of mounting relay circuit 156.

The relay (+) and the relay (−) in mounting relay circuit 156 have the same configurations as the relay (+) and the relay (−) in quick-charge relay circuit 116Q; hence, the same reference numerals are given to the same elements, and the descriptions thereof will be omitted.

Separation of movable contact MC of the relay (+) from one-side fixed contact FC and other-side fixed contact FC on the relay (+), or separation of movable contact MC of the relay (−) from one-side fixed contact FC and other-side fixed contact FC of the relay (−) makes it possible to cut off power supplied from battery 111 to the load (not illustrated) via power supply line 153L and the power supply line (not illustrated). In either the relay (+) or the relay (−) of mounting relay circuit 156, a state in which movable contact MC is welded to each of one-side fixed contact FC and other-side fixed contact FC and thus cannot be separated is referred to as a "welding failure of relay," a "single-welding failure of relay" or simply as a "single-welding failure." In addition, a state in which, in both the relay (+) and the relay (−), movable contact MC is welded to each of one-side fixed contact FC and other-side fixed contact FC and thus cannot be separated is referred to as a "double-welding failure of relay" or simply as a "double-welding failure." Further, either or both of the single-welding failure and double-welding failure is/are collectively referred to as a "welding failure."

(Detection Section 157)

Detection section 157 detects each of the following states of mounting relay circuit 156: open state; closed state; opening failure; and welding failure (closing failure). Detection section 157 also outputs an error signal indicating that a state of mounting relay circuit 156 cannot be detected. Detection section 157 may be referred to as a "second detection section." Further, a detection signal of each of the opening failure and welding failure, and the error signal may be referred to as an "abnormality signal from mounted object side" or simply as an "abnormality signal". Here, the term "opening failure" refers to a state where closing is impossible due to a failure.

(Control Section 158)

Control section 158 is a processor such as a Central Processing Unit (CPU) or a Graphics Processing Unit (GPU), and executes a program stored in a storage apparatus (not illustrated) so as to centrally control a plurality of devices composing mounted object 150. In addition, control section 158 acquires an abnormality signal and controls communication section 155 such that the acquired abnormality signal is transmitted to communication section 115.

(Communication Section 155)

Exchange of information between communication sections 155 and 115 is made via any means. For example, communication section 155 and communication section 115 are connected to each other by communication network NW including a function that enables wireless internet communication. This allows communication section 155 to transmit the abnormality signal from the side of mounted object 150 to a side of vehicle body 110.

(Communication Section 115)

Communication section 115 transmits and receives information to and from communication section 155. Communication section 115 may be referred to as a "reception section." Communication section 155 may be referred to as a "transmission section."

(Storage Section 113)

Storage section 113 is a storage apparatus such as a Read Only Memory (ROM) that stores therein a Basic Input Output System (BIOS) of a computer for realizing control section 119, a Random Access Memory (RAM) that serves as a work area of control section 119, and a Hard Disk Drive (HDD) and a Solid State Drive (SSD) that store therein an Operating System (OS), an application program, various pieces of information to be referred to when the application program is executed.

(Control Section 119)

Figure 3:
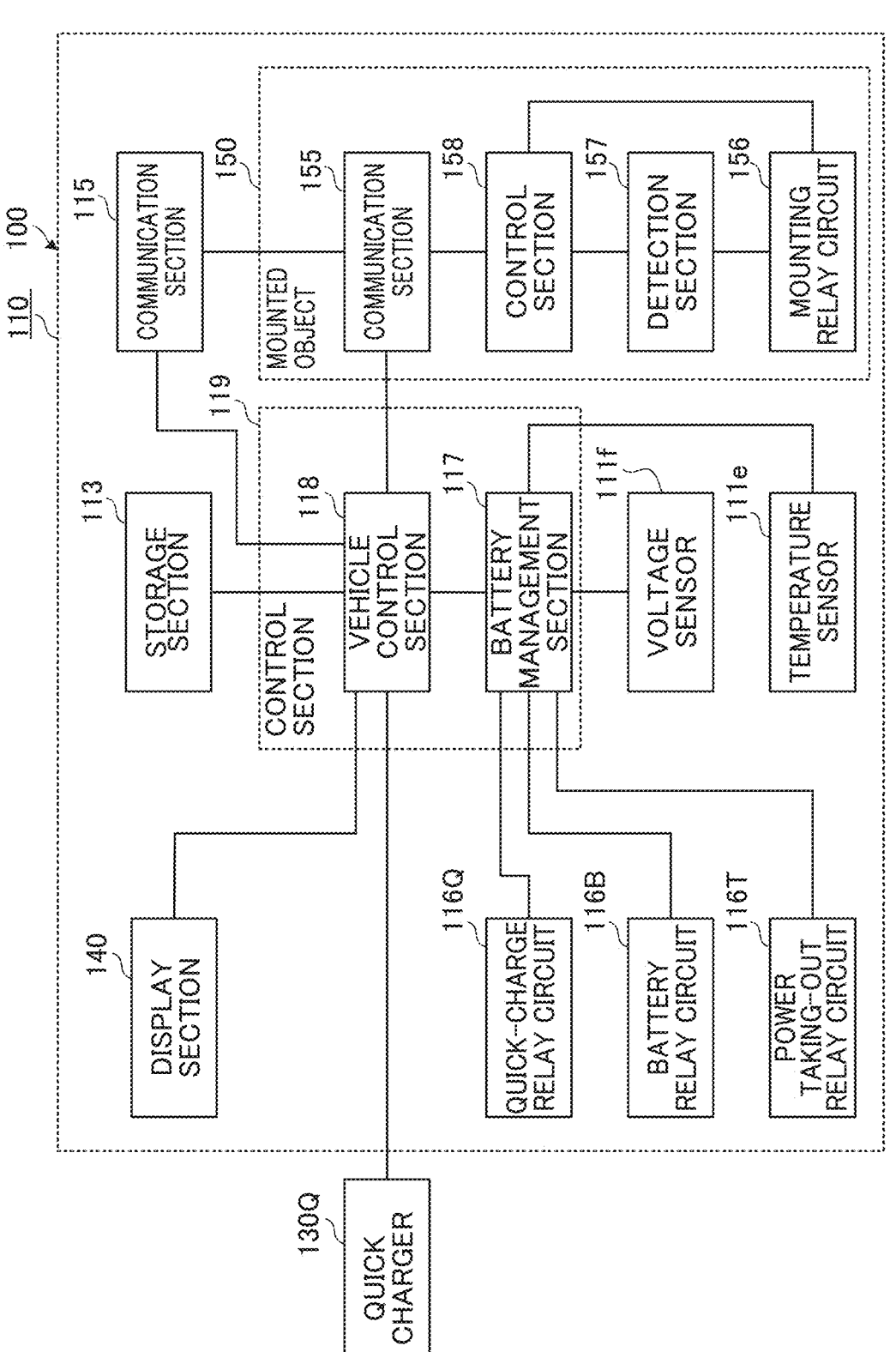
FIG. 3 is a configuration block diagram illustrating an exemplary power system of the electric vehicle in the embodiment of the present disclosure.

Next, control section 119 will be described with reference to FIGS. 1 and 3. FIG. 3 is a configuration block diagram illustrating the exemplary power system of the electric vehicle in the embodiment of the present disclosure.

Control section 119 is a processor such as a Central Processing Unit (CPU) and a Graphics Processing Unit (GPU) and has various functions by executing a program stored in storage section 113.

Control section 119 executes control in accordance with a state of each of quick-charge relay circuit 116Q, power taking-out relay circuit 116T, and mounting relay circuit 156, from the viewpoint of improving safety and protecting battery 111.

Control section 119 stores predetermined information in storage section 113. Control section 119 causes display section 140 to display the predetermined information. The predetermined information stored in storage section 113 includes, for example, information indicating the welding failure (single-welding failure or double-welding failure) of each of quick-charge relay circuit 116Q and power taking-out relay circuit 116T.

Control section 119 is realized by, for example, computing resources such as a plurality of processors and memories. In this case, each component composing control section 119 is realized by at least one processor among the plurality of different processors executing a program. Control section 119 may be composed of a single apparatus. In this case, for example, control section 119 may be composed of all of battery management section 117 and vehicle control section 118 illustrated in FIG. 3. Alternatively, control section 119 may be composed of a plurality of apparatuses. In this case, for example, control section 119 may be composed of each of battery management section 117 and vehicle control section 118, or may be composed of a combination of the two and another apparatus.

As mentioned above, battery-pack management system 117P and battery management system 117J are collectively referred to as "battery management section 117." In the present embodiment, battery management section 117 and vehicle control section 118 are assumed to be included in control section 119. Battery management section 117 may be provided at vehicle body 110 as a separate apparatus from vehicle control section 118.

(Battery Management Section 117)

Battery management section 117 executes, based on a state of battery 111 (e.g., cell temperature or cell voltage), close/open control of battery relay circuit 116B such that connection/disconnection between high voltage line 111L and power supply line 122L is performed.

Battery management section 117 also executes, based on a state of battery 111 (e.g., State Of Charge (SOC)), close/open control of quick-charge relay circuit 116Q such that connection/disconnection between power supply line 121LQ and power supply line 122L is performed.

Battery management section 117 also includes a third detection section (not illustrated) that detects each of the following states of quick-charge relay circuit 116Q: open state; closed state; opening failure; and welding failure (closing failure). The third detection section outputs, as a detection result, a relay-state signal indicating the state of quick-charge relay circuit 116Q. The third detection section also outputs an error signal indicating that a state of quick-charge relay circuit 116Q cannot be detected.

Further, battery management section 117 determines, based on the detection result of the third detection section, whether a welding failure (single-welding failure or double-welding failure) has occurred in quick-charge relay circuit 116Q (welding diagnosis). Battery management section 117 performs the welding diagnosis at a predetermined timing and performs Control Area Network (CAN) transmission of information thereon (determination result on quick-charge relay circuit 116Q) to vehicle control section 118. For example, battery management section 117 performs the welding diagnosis at a key-off time and stores information thereon in, for example, an internal memory, then performing the CAN transmission of the information to vehicle control section 118 at the next key-on time (at start-up). Here, the phrase "CAN transmission of information" refers to transmitting information over a CAN bus.

Further, when quick-charge relay circuit 116Q has the double-welding failure, battery management section 117 executes open control of battery relay circuit 116B.

Meanwhile, when quick-charge relay circuit 116Q has the single-welding failure, battery management section 117 executes open control of quick-charge relay circuit 116Q even upon receiving a request for closing from vehicle control section 118 which is a higher component.

Further, battery management section 117 controls battery relay circuit 116B such that the power supplied from battery 111 to mounted object 150 is cut off when a state of power taking-out relay circuit 116T (first protection circuit) is the closing failure and a detection result of detection section 157 (second detection section) indicates that a state of mounting relay circuit 156 (second protection circuit) is either the closed state, closing failure, or opening failure.

Battery management section 117 also determines whether the third detection section has failed, based on the error signal output from the third detection section. Battery management section 117 performs the CAN transmission of a determination result on the third detection section to vehicle control section 118.

Further, when receiving an abnormality signal from vehicle control section 118 (abnormality signal from mounted object), battery management section 117 executes a protective operation as battery management section 117, for example, the open control of power taking-out relay circuit 116T.

Battery management section 117 also includes a first detection section (not illustrated) that detects each of the following states of power taking-out relay circuit 116T: open state; closed state; opening failure; and welding failure (closing failure). The first detection section outputs, as a detection result, a relay-state signal indicating the state of power taking-out relay circuit 116T. The first detection section also outputs an error signal indicating that a state of power taking-out relay circuit 116T cannot be detected.

Further, battery management section 117 determines, based on the detection result of the first detection section, whether a welding failure (single-welding failure or double-welding failure) has occurred in power taking-out relay circuit 116T (welding diagnosis). Battery management section 117 performs the welding diagnosis at a predetermined timing and performs CAN transmission of information thereon (determination result on power taking-out relay circuit 116T) to vehicle control section 118. For example, battery management section 117 performs the welding diagnosis at a key-off time and stores information thereon in, for example, an internal memory, then performing the CAN transmission of the information to vehicle control section 118 at the next key-on time (at start-up).

Battery management section 117 also determines whether the first detection section has failed, based on the error signal output from the first detection section. Battery management section 117 performs the CAN transmission of a determination result on the first detection section to vehicle control section 118.

(Vehicle Control Section 118)

Vehicle control section 118 (VCU) determines a state of electric vehicle 100 and executes control for keeping electric vehicle 100 in an optimum state. To be more specific, when detecting an abnormality in electric vehicle 100, vehicle control section 118 controls electric motor 112 such that electric vehicle 100 is stopped. Additionally, vehicle control section 118 controls supply power from battery 111 to electric motor 112 by varying a voltage between battery 111 and electric motor 112. Further, vehicle control section 118 controls supply power from battery 111 to the heater (not illustrated) by varying a voltage between battery 111 and the heater (not illustrated). Vehicle control section 118 also controls quick charger 130Q such that, for example, charging power for charging battery 111 does not exceed a chargeable power.

Figure 4:
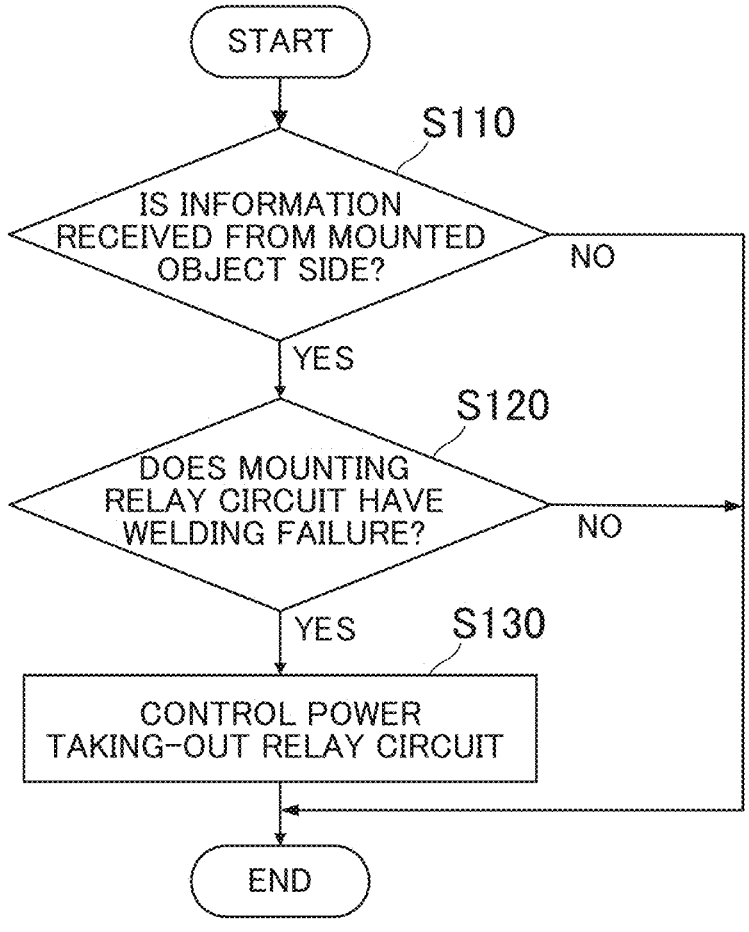
FIG. 4 is a flowchart describing an exemplary operation of a control section in the power system in the embodiment of the present disclosure.

Next, an exemplary operation of control section 119 in the present embodiment will be described with reference to FIG. 4. FIG. 4 is a flowchart describing an exemplary operation of control section 119 in the present embodiment. This flow is initiated when electric vehicle 100 (EV) is operated or when a mode is changed. Note that this flow is repeated at regular intervals. In the following description, control section 119 will be described as including the respective functions of battery control section 117 and vehicle control section 118.

First, in step S110, control section 119 determines whether communication section 115 has received information from a side of mounted object 150 (communication section 155). When communication section 115 receives the information from communication section 155 (step 110: YES), processing proceeds to step S120. When communication section 115 does not receive the information from communication section 155 (step 110: NO), this flow ends.

Next, in step S120, control section 119 determines whether the information received by communication section 115 is information indicating a welding failure of mounting relay circuit 156. When the information received by communication section 115 is the information indicating the welding failure of mounting relay circuit 156 (step S120: YES), processing proceeds to step S130. When the information received by communication section 115 is not the information indicating the welding failure of mounting relay circuit 156 (step S120: NO), this flow ends.

In step S130, control section 119 controls power taking-out relay circuit 116T such that power of power supply lines 122L and 123L is cut off. After that, this flow ends.

Electric vehicle 100 in the above embodiment is an electric vehicle that includes: mounted object 150 operated by power; and vehicle body 110 equipped with mounted object 150, in which vehicle body 100 includes: battery 111 that supplies power to electric motor 112 for operation of vehicle body 110; first power supply lines 122L and 123L that supply the power from battery 111 to mounted object

150; power taking-out relay circuit 116T that is installed on first power supply lines 122L and 123L and that is capable of cutting off the power; and control section 119 that controls an operation of power taking-out relay circuit 116T, and mounted object 150 includes: power supply lines 153L and 154L that are connected to power supply lines 122L and 123L; load 152 that receives the power via power supply lines 153L and 154L; and mounting relay circuit 156 that is installed on power supply lines 153L and 154L and that is capable of cutting off the power.

According to the above configuration, in supplying power from battery 111 on a side of vehicle body 110 to mounted object 150, when a trouble arises on a side of mounted object 150, power supply to mounted object 150 can be cut off on the side of vehicle body 110, and mounted object 150 itself can cut off the power supply, thereby making it possible to place power taking-out relay circuit 116T at an appropriate position on power supply lines 122L and 123L and to place mounting relay circuit 156 at an appropriate position on power supply lines 153L and 154L.

Further, in electric vehicle 100 in the above embodiment, mounted object 150 further includes: detection section 157 that detects a state of mounting relay circuit 156; and communication section 155 that transmits, to vehicle body 110, information indicating the state of mounting relay circuit 156, and vehicle body 110 further includes communication section 115 that receives the information indicating the state of mounting relay circuit 156, in which control section 119 controls power taking-out relay circuit 116T in accordance with the information indicating the state of mounting relay circuit 156. This makes it possible to supply and cut off power from battery 111 to mounted object 150 in accordance with the state of mounting relay circuit 156.

Further, in electric vehicle 100 in the above embodiment, mounting relay circuit 156 includes a relay, and information indicating a state of mounting relay circuit 156 is information including an opening failure and a welding failure of the relay. When the state of mounting relay circuit is the welding failure, power taking-out relay circuit 116T is controlled such that the power is cut off, and when the state of the mounting relay circuit is the opening failure, power taking-out relay circuit 116T is controlled such that the power is not cut off. This makes it possible to perform power supply in accordance with the state of mounting relay circuit 156.

Further, in electric vehicle 100 in the above embodiment, control section 119 controls power taking-out relay circuit 116T such that the power of first power supply lines 122L and 123L is cut off in a case where information indicating a state of mounting relay circuit 156 is information indicating a welding failure. Since power taking-out relay circuit 116T is placed at the appropriate position, it is made possible for control section 119 on the side of vehicle body 100 to cut off the power from battery 111 to mounted object 150 when the state of mounting relay circuit 156 is the information indicating the welding failure.

Note that, in the present embodiment, battery 111 may be charged by a commercial AC power supply (not illustrated). In this case, a charger (not illustrated) provided inside vehicle body 110 and battery 111 are electrically connected to each other. Charging is made possible when a charging cable extended from the commercial AC power supply is electrically connected to the charger.

The embodiment described above is merely an example of specific implementation of the present invention, and the technical scope of the present invention should not be restrictively interpreted by this embodiment. That is, the present invention may be implemented in various forms without departing from the spirit thereof or the major features thereof.

INDUSTRIAL APPLICABILITY

The present disclosure is suitable for use in an electric vehicle equipped with a power supply circuit required to improve the safety and protect a component.

The invention claimed is:

1. An electric vehicle that includes:
a mounted object operated by power; and
a vehicle body equipped with the mounted object, wherein
the vehicle body includes:
   a battery that supplies power to an electric motor for operation of the vehicle body;
   a first power supply line that supplies the power from the battery to the mounted object;
   a first protection circuit that is installed on the first power supply line and that is capable of cutting off the power;
   a receiver that receives information transmitted from the mounted object; and
   a control section that controls an operation of the first protection circuit, and the mounted object includes:
   a second power supply line that is connected to the first power supply line;

a load that receives the power via the second power supply line;
   a second protection circuit that is installed on the second power supply line and that is capable of cutting off the power;
   a detection section that detects a welding state of the second protection circuit; and
   a transmitter that transmits information indicating the welding state of the second protection circuit to the receiver of the vehicle body,
   wherein the control section of the vehicle body obtains information indicating the welding state of the second protection circuit from the mounted object through the receiver, and controls the first protection circuit to cut off power on the first power supply line if a welding failure bas occurred in the second protection circuit.

2. The electric vehicle according to claim 1, wherein the first power supply line and the second power supply line are connected via a detachable connector, and the connector is interposed between the first protection circuit and the second protection circuit.

3. The electric vehicle according to claim 1, wherein the control section of the vehicle body, repeatedly at regular intervals, obtains information indicating the welding state of the second protection circuit from the mounted object through the receiver, and controls the first protection circuit to cut off power on the first power supply line if a welding failure has occurred in the second protection circuit.

* * * * *